US010000037B2

(12) United States Patent
Nishimura et al.

(10) Patent No.: US 10,000,037 B2
(45) Date of Patent: Jun. 19, 2018

(54) TRANSPARENT LAMINATE AND PROTECTIVE TOOL INCLUDING THE SAME

(71) Applicant: DEXERIALS CORPORATION, Shinagawa-ku, Tokyo (JP)

(72) Inventors: Kimitaka Nishimura, Tokyo (JP); Emi Yoshida, Tokyo (JP); Eiji Ohta, Tokyo (JP); Shinichi Matsumura, Tokyo (JP); Shigehisa Ohkawara, Tokyo (JP)

(73) Assignee: Dexerials Corporation, Tokyo (JP)

( * ) Notice: Subject to any disclaimer, the term of this patent is extended or adjusted under 35 U.S.C. 154(b) by 0 days. days.

(21) Appl. No.: 14/910,598

(22) PCT Filed: Jun. 4, 2014

(86) PCT No.: PCT/JP2014/002980
§ 371 (c)(1),
(2) Date: Feb. 5, 2016

(87) PCT Pub. No.: WO2015/019529
PCT Pub. Date: Feb. 12, 2015

(65) Prior Publication Data
US 2016/0193808 A1    Jul. 7, 2016

(30) Foreign Application Priority Data

Aug. 9, 2013   (JP) .................................. 2013-165708
Mar. 28, 2014  (JP) .................................. 2014-069558

(51) Int. Cl.
*B32B 7/06* (2006.01)
*B32B 7/12* (2006.01)
(Continued)

(52) U.S. Cl.
CPC .................. *B32B 7/06* (2013.01); *A42B 3/22* (2013.01); *B32B 3/30* (2013.01); *B32B 7/12* (2013.01);
(Continued)

(58) Field of Classification Search
CPC .... B32B 7/06; B32B 7/12; B32B 3/30; B32B 2307/412; B32B 2437/04; B32B 2571/00; A42B 3/22; Y10T 428/14
See application file for complete search history.

(56) References Cited

U.S. PATENT DOCUMENTS 2,511,329 A  *  6/1950  Craig ..................... A61F 9/022
                                                        2/12
3,904,281 A  *  9/1975  Jampolsky ............... G02B 3/08
                                                    351/159.09
(Continued)

FOREIGN PATENT DOCUMENTS

JP    2000-192322    7/2000
JP    2002-528298    9/2002
(Continued)

OTHER PUBLICATIONS

International Search Report received in PCT/JP2014/002980, dated Sep. 9, 2014 (4 pages).

*Primary Examiner* — Patricia L. Nordmeyer
(74) *Attorney, Agent, or Firm* — K&L Gates LLP

(57) ABSTRACT

The purpose of the present invention is to prevent an increase in reflectance and a decrease in transmittance, retain the intact instantaneousness and ease of stripping, improve the releasability of the adhesive, avoid the generation of distortion due to the thickness of the adhesive, and ensure the visibility, by laminating filmy members (10) each equipped with a moth-eye structure (12). This transparent laminate (1) comprises a plurality of filmy members (10) which each comprise a base (11) and, disposed on at least (Continued)

one surface thereof, a structure (12) made up of recesses and protrusions which have been regularly arranged at a pitch not longer than the wavelengths of visible light. At least the ends of the filmy members (10) have been superposed, with a pressure-sensitive adhesive layer (2) interposed therebetween. In the superposed filmy members (10), there is a space (14) between the opposed structures (12).

13 Claims, 10 Drawing Sheets

(51) Int. Cl.
 A42B 3/22 (2006.01)
 B32B 3/30 (2006.01)
 G02B 1/118 (2015.01)
(52) U.S. Cl.
 CPC ........ *G02B 1/118* (2013.01); *B32B 2307/412* (2013.01); *B32B 2437/04* (2013.01); *B32B 2571/00* (2013.01)

(56) References Cited

U.S. PATENT DOCUMENTS

| 5,002,326 | A | | 5/1991 | Westfield | |
| 5,502,516 | A | * | 3/1996 | Elterman | G02C 7/10 351/41 |
| 5,592,698 | A | | 1/1997 | Woods | |
| 6,536,045 | B1 | * | 3/2003 | Wilson | A42B 3/26 2/15 |
| 6,696,225 | B1 | * | 2/2004 | Kanbe | B41M 5/368 347/105 |
| 6,847,492 | B2 | | 1/2005 | Wilson | |
| 7,184,217 | B2 | | 2/2007 | Wilson | |
| 2005/0001586 | A1 | | 1/2005 | Tashiro | |
| 2005/0015860 | A1 | | 1/2005 | Reaux | |
| 2012/0147472 | A1 | * | 6/2012 | Kajiya | B32B 3/30 359/601 |

FOREIGN PATENT DOCUMENTS

| JP | 2003-222701 | 8/2003 |
| JP | 2010048902 | 3/2010 |
| JP | 4849183 | 1/2012 |
| JP | 2012086515 | 5/2012 |
| JP | 3178509 | 9/2012 |
| JP | 2013-195579 | 9/2013 |
| WO | 2004/000540 | 12/2003 |
| WO | 2010/073881 | 7/2010 |
| WO | 2011/027909 | 3/2011 |
| WO | 2011/149948 | 12/2011 |
| WO | 2013/081145 | 6/2013 |
| WO | 2014/112555 | 7/2014 |

* cited by examiner

ADHERED SURFACE    NON-ADHERED SURFACE

ADHERED SURFACE    NON-ADHERED SURFACE

ADHERED SURFACE  NON-ADHERED SURFACE

ADHERED SURFACE  NON-ADHERED SURFACE

ADHERED SURFACE

ADHERED SURFACE

ADHERED SURFACE

ADHERED SURFACE

TRANSPARENT LAMINATE AND PROTECTIVE TOOL INCLUDING THE SAME

The present application is a national stage of International Application No. PCT/JP2014/002980 filed on Apr. 6, 2014 and claims the benefit of Japanese Priority Patent Application JP 2013-165708 filed Aug. 9, 2013, and Japanese Priority Patent Application JP 2014-069558 filed Mar. 28, 2014, the entire contents of each which are incorporated herein by reference.

BACKGROUND

This invention relates to a transparent laminate characterized in that, e.g., plural filmy members are pasted and overlapped with a space between the overlapped members at least at a part area of the filmy member, which is formed with a plurality of structures arranged with a pitch not greater than a visible light wave length on at least one side of a flexible base, and to a protection tool using the same.

SUMMARY

A surface of a conventional shield for a helmet used for motorcycle racing and motor racing may be suffer from dirtiness in a short time, thereby disturbing the vision field occasionally. A protection google for painting used during painting work may receive e.g., scattered paint during the painting work, so that the surface of the google may get dirty as to disturb the vision field. A surface of a medical glass or a face shield may get dirty from blood scattered from a patient during the operation.

In circumstances that no one can predict arrivals of such contaminants, immediate recovery of the vision field is required. However, there are some situations providing no extra time to wipe off contaminants during such as, e.g., a motor racing, and some situations, such as during surgical operations, that contact to the contaminants is not appropriate because it is dangerous at all. Such problems may frequently occur in situations, other than motor racings and painting works as described above, where helmets, googles, protection glasses are used.

To solve such a problem, protections films peelable easily are overlapped in a plural number on a surface of a shield of a helmet or a protection glass for painting, and when contaminants disturbs the vision field, the topmost protection film is removed with the contaminants to make recovery of vision. For this kind of the art, for example, disclosed in Patent Document #1 is a protection device for a shield portion of a helmet attaching a plurality of sheet like protection covers, or namely, a disposable visor, so as to cover the shield portion of the helmet.

Where as described above the protection device is configured to simply have an overlapping structure of protection films, however, reflections may occur at boundaries between layers where overlapped. There also raises a problem such that the transparency is simply lowered as the overlapping number increases, or namely the overlapping sheet number may be limited.

For example, as the protection films described above, transparent plastic films can be used generally. As such plastic films, generally used are films having a refractive index of 1.4 to 1.6, having a light reflection of 4% to 5% on each of the double sides of the film, and having an entire transmittance of 90% to 92%. A single film has a transmittance of around 90%, but 81% when two films are overlapped, and 73% when three films are overlapped, so that there raises a problem lowering the light transmittance to make visibility worse as the sheet number of the films increases.

On the other hand, optical devices and films having a moth-eye structure having a pitch no more than a visible light wavelength have been well known. As disclosed in, e.g., Patent Document #2, as a method for providing a moth-eye structure on a transparent base, there is a method for sandwiching a not yet cured ultraviolet curable resin between masters having a structure shape on the surface thereof to obtain the structure upon light radiation.

Such a moth-eye structure has an advantage that the color tone may not change when an object is viewed through the moth-eye structure because of corresponding to the entire wavelength basically as different from antireflection films used for liquid crystal displays corresponding to particular wavelength or wavelengths.

In paying attention to such an advantage of the moth-eye structure, e.g., Patent Document #3 discloses a low reflection transparent plate and a display casing using the plate realizing a low reflectance from a moth-eye effect provided from the surface fine structure.

Patent Document #1: Japanese Patent Application Publication No. 2000-192322 (A1).
Patent Document #2: Japanese Patent Application Publication No. 2012-86515 (A1).
Patent Document #3: Japanese Patent Application Publication No. 2010-48902 (A1).

SUMMARY OF THE INVENTION

Problems to be Solved by the Invention

As disclosed in Patent Document #2 described above, however, the optical property may be lowered from breakdown or the like of the structure due to friction as nature of the resin where the moth-eye structure is obtained with the ultraviolet curable resin. In assuming of application to e.g., a shield of a helmet, a google, and a protection glass, it is therefore not desirable to wipe off stains where such stains disturbing visual recognition are attached onto the surface thereof.

It is conceivable to peel off the topmost protection film with stains to recover the viewing field when the stain disturb the viewing field where the protection film having the moth-eye structure on one side of the base is overlapped in a plural number to form a transparent laminate, from the problem of breakdown due to friction and from a viewpoint to instantaneously ensure the viewing field as described above. In such a case, however, it is not desirable from a viewpoint to instantaneousness of peeling and easiness if the entire surface of the moth-eye structure of the protection film is adhered. The thickness of the adhesive may bring deformation.

This invention is made in consideration of solving the above technical problems as described above. It is an object of the invention to provide a transparent laminate and a protection tool using the same, with overlapping filmy members having a moth-eye structure, to prevent the reflectance from becoming higher and the transmittance from becoming lower, not to lose instantaneousness of peeling and easiness, to improve mold releasing property of an adhesive by limiting an adhering area such as forming with, e.g., a narrower width, to avoid occurrences of deformation of the adhesive thickness, and to ensure the visual recognition property.

Mean for solving the problems

To solve the above described technical problems, a transparent laminate according to a first aspect of the invention includes a plurality of filmy members each configured to be formed on at least one side of a base with structures having protrusions and recesses whose pitch is equal to or less than visible light wavelength, wherein the filmy members are overlapped via an adhesive layer at least at an end thereof, wherein the overlapped filmy members are provided with a space arranged between the structures facing each other, and wherein the secured filmy member is jointed in a peelable manner with an adhesive layer arranged at least at an outer edge serving as the end.

A protection tool according to a second aspect of the invention is formed with the transparent laminate at a visual recognition area.

The transparent laminate and the protection tool using the same according to the invention, with overlapping filmy members having a moth-eye structure, can prevent the reflectance from becoming higher and the transmittance from becoming lower, not lose instantaneousness of peeling and easiness, improve mold releasing property of an adhesive by limiting an adhering area such as forming with, e.g., a narrower width, avoid occurrences of deformation of the adhesive thickness, and ensure the visual recognition property.

DETAILED DESCRIPTION

Figure 1:
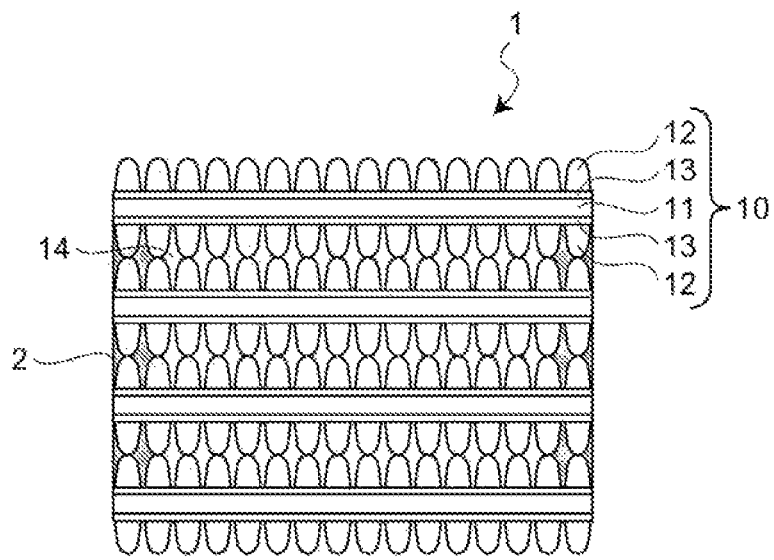
FIG. 1 is a structural view of a transparent laminate according to an embodiment of the invention.

Hereinafter, preferred embodiments according to a transparent laminate and a protection tool using the same of the invention are described with reference to the drawings. The transparent laminate and the protection tool using the same of the invention are not limited to descriptions below but modifiable as appropriate as far as not deviated from the scope of the invention.

First, the outline of the transparent laminate of the invention is described. A structure is formed on double sides of a flexible base with a pitch not more than visible light wavelength. The fine protrusion and recess structure having an antireflection function is hereinafter called to as "moth-eye structure." A space can be produced between the filmy members when the plural filmy members are overlapped. An adhering area of the adhesive layer of the filmy members can be designed properly to form the prescribed space between the structures. For example, in one example, the adhesive layer is formed only at an end or ends; the adhesive layer can be formed in lines or dots, and further formed in both of lines and dots. The adhesive layer may be formed not only at the ends of the filmy member, including an arrangement extending the entire surface, and in this case, peeling property may be different between the ends and areas other than the ends. Areas other than the ends are desirably required to have a weaker peeling property than the ends.

As other examples, the end of the filmy member or a part of the end may be physically secured and overlapped. As an example, securing or immobilizing can be made with pins or in engagement with immobilized pins or hooks, in a state that the filmy members are overlapped. The secured portion formed at the end or a part of the end is required to be made as to settle the transparent laminate. A part of the filmy member may be fabricated with such as a cut. The laminate may be secured by using an ultraviolet melting method or a heating melting method.

That is, in consideration that the optical property of the conventional film is lowered with overlapping, the filmy members having the moth-eye structure are overlapped in this invention. Because problems of lowered transmittance and reflection on a back side of the filmy member occur with the overlapping structure of the filmy member having the moth-eye structure on only one side, the transparent laminate is structured with the filmy members having the moth-eye structure on the double sides. This makes an overlapping shield structure free from lowering of transmittance, and the overlapping number can be increases because the transparency is improved. The laminate having the moth-eye structure on one side, however, is not excluded.

Securing can be made easily where overlapping is made with the adhesive layer of, e.g., adhesive. It is desirable to form the adhesive at an outer peripheral portion, which extends outside the viewing field when attached. Where the adhesive is not formed across the entire surface of the filmy member, conditions satisfying both of feature and cost such as i) peeling property improvement of the filmy member itself, ii) peeling property improvement of the adhesive (avoiding view recognition from lowering due to residues), and iii) avoidance of deformation occurrences due to the thickness of the adhesive, can be found easily. The laminate in which the entire surface is adhered by the adhesive layer, however, is not excluded.

By overlapping the filmy members having the moth-eye structure, the protection tool with a shield can enjoy higher usability because causes for lowering the visual recognition property and all can be eliminated by peeling the filmy member when necessary even where stains make the visual recognition property low.

With the outline described above, embodiments according to the invention are described in detail.

Embodiment

FIG. 1 is a structural view of a transparent laminate according to an embodiment of the invention.

As shown in FIG. 1, a transparent laminate 1 is structured of plural filmy members 10 as optical devices, which are jointed by adhesive layers 2 made of such as adhesive. Each filmy member 10 has structures 12 on double sides of a base 11 via a bottom layer 13.

The filmy member 10 serving as the optical device has the double sides, a front side and a back side, opposite to each other, which is with an antireflection function.

That is, the filmy member 10 includes the base 11 having the front side and back side, the bottom layers 13 overlapped on the front side and the back side of the base 11, and plural structures 12 formed via the bottom layers 13. The plural structures 12 are arranged regularly as to form plural lines on the bottom layer 13 on the front side and the back side of the base 11. Thus, the front side and the back side of the filmy member 10 have a shape of protrusions and recesses of moth-eye structures made of the plural structures 12. Alternatively, the structure 12 can be formed only on the front side.

In other words, the front side and the back side of the filmy member 10 are surfaces of protrusions and recesses made of the moth-eye structures having the plural structures in a pitch equal to or less than the visible light wavelength. With formation of the surfaces of protrusions and recesses on the front side and the back side of the filmy member 10, an optical adjustment function having less wavelength dependency and providing an excellent visible recognition property can be given to the surface of the object to which the transparent laminate 1 is attached. That is, the transparent laminate 1 can contribute realizing the object with the excellent visible recognition property.

The term "optical adjustment function" indicates the optical adjustment function of transparency feature and reflection feature. The filmy member 10 serving as the optical device has a transparency with respect to, e.g., visible light, and preferably has a refraction index in a range, preferably not less than 1.30 and not more than 2.00, and more preferably not less than 1.34 and not more than 2.00 It is not limited to these ranges.

The refraction index of the structure 12 is preferably, substantially the same as the refraction index of the adhesive layer 2 and the base 11. This is because the index can suppress interior reflections and can improve the contrast.

In FIG. 1, the example formed with the structures 12 on the double sides of the base 11 via the bottom layer 13 is shown, and the bottom layer 13 plays a role to improve adherence of the structure 12 to the base 11. In this case, the bottom layer 13 is an optical layer formed in a united body with the structure 12 on the bottom side of the structure 12, has a transparency, and may be formed by curing e.g., an energy ray curable resin component substantially the same as the structure 12.

Figure 2:
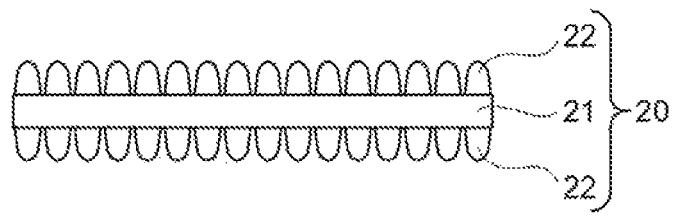
FIG. 2 is a view showing another structural example of an optical device as a structural element of the transparent laminate according to an embodiment of the invention.

Alternatively, for example, as shown in FIG. 2, a filmy member 20 may be formed directly with the moth-eye structure made of plural structures 22 on a base 21, without any bottom layer 13.

Figure 3:
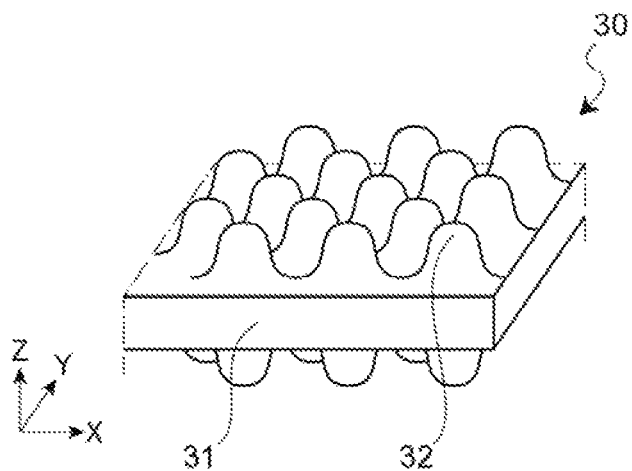
FIG. 3 is a view showing yet another structural example of an optical device as a structural element of the transparent laminate according to an embodiment of the invention.

Moreover, the base and the structures can be formed in a united body as shown in, e.g., FIG. 3. That is, with the situation of the structure shown in FIG. 3, the structures 32 are formed on the double sides of the base 31 in a united body to constitute a filmy member 30.

The base 11 is further referred herein.

The base 11 is, e.g., a transparent base having a transparency. Exemplified as a material for the base 11 are what are having a plastic material having a transparency as a main component, but the base 11 is not limited to being made of those materials.

Where a plastic material is used as the base 11, a primer layer not shown may be further formed from a surface process to improve surface energy, coating property, slidablity, and flatness on the surface of the plastic material. Exemplified as the primer layer are, e.g., organoalkoxy metal compound, polyester, acrylic-modified polyester, and polyurethane. To obtain substantially the same effect as formation of the primer layer, such as a corona discharge processing or a ultraviolet radiation processing may be made to the surface of the base 11.

Where the base 11 is a plastic film, the base 11 can be made from, e.g., methods drawing the resin described above or making the resin into a film after diluting the resin in a solvent t and then drying the film. The thickness of the base 11 is preferably chosen according to usage of the transparent laminate 1, and can be, e.g., around not less than 50 microns and not more than 500 microns. As the shape of the base 11, exemplified are film shape, plate shape, etc., but the shape of the base 11 is not limited to these shapes. It is to be noted that the film includes a sheet.

As a material for the base 11, exemplified are, e.g., methyl methacrylate (co)polymer, poly carbonate, styrene (co)polymer, methyl methacrylate-styrene copolymer, cellulose diacetate, cellulose triacetate, cellulose acetate butyrate, polyester, polyamide, polyimide, polyether sulfone, polysulfone, polypropylene, polymethylpentene, polyvinyl chloride, polyvinyl acetal, polyether ketone, polyurethane, glass, etc. but the material is not limited to these.

Next, the structure 12 is further referred.

In general, the wavelength range of the visible light is from 360 nm to 830 nm, and in this embodiment, the structure 12 is regularly arranged with a size not more than the wavelength range of the visible light. From this viewpoint, the arrangement pitch of the structure 12 does not exceed 350 nm. The structure 12 can be in various shapes such as, e.g., prism shapes, pillar shapes, and needle shapes. The structure 12 is formed by curing, e.g., energy ray curable resin component. The energy ray curable resin component forming the structure 12 may have different material features between the double sides of the base 11. For example, by using water repellant feature and hydrophilic feature differently according to the usage, a particular surface may have, e.g., an antifogging function.

As the energy ray curable resin component, it is preferable to use ultraviolet curable resin component. The energy ray curable resin component may include fillers or functional additives as needed.

The ultraviolet curable resin component includes, e.g., acrylate and initiator.

The ultraviolet curable resin component includes, e.g., monofunctional monomers, bifunctional monomers, and polyfunctional monomers, and more specifically, includes a single material or a mixture of plural materials shown below.

That is, as "monofunctional monomers," exemplified are, e.g., carboxylic acids (acrylic acid), hydroxyls (2-hydroxyethyl acrylate, 2-hydroxylpropyl acrylate, 4-hydroxylbutyl acrylate), alkyls, alicyclic (isobutyl acrylate, t-butyl acrylate, isooctyl acrylate, lauryl acrylate, stearyl acrylate, isobonyl acrylate, cyclohexyl acrylate), and other functional monomers (2-methoxyethyl acrylate, methoxyethylene glycol acrylate, 2-etokyethyl acrylate, tetrahydrofurfuryl acrylate, benzyl acrylate, ethyl carbitol acrylate, phenoxy ethyl acrylate, N, N-dimethyl aminoethyl acrylate, N, N-dimethyl aminopropyl acrylamide, N, N-dimethyl acrylamide, acryloyl morpholine, N-isopropyl acrylamide, N, N-diethyl acrylamide, N-vinyl pyrrolidone, 2-(perfluorooctyl) ethyl acrylate, 3-perfluorohexyl-2-hydroxypropyl acrylate, 2-(perfluorodecyl) ethyl acrylate, 2-(perfluo-3-methylbutyl) ethyl acrylate, 2,4,6-tribromophenol acrylate, 2,4,6-tribromophenol methacrylate, 2-(2,4,6-tribromophenoky) ethyl acrylate, and 2-ethylhexyl acrylate.

As "bifunctional monomers," exemplified are, e.g., tri (propylene glycol) diacrylate, trimethylolepropane, diallyl ether, and urethane acrylate.

As "polyfunctional monomers," exemplified are, e.g., trimethylolpropane triacrylate, dipentaerythritol penta(hexa)acrylate, and ditrimethyolpropane tetraacrylate.

As "initiator," exemplified are, e.g., 2,3-dimetoxy-1,2-diphenylethan-1-one, 1-hydroxy-cyclohexilphenylkenoton, and 2-hydroxy-2-methyl-1-phenylpropane-1-one.

As "filler," usable are any of inorganic particles and organic particles. As such as inorganic particles, exemplified are, e.g., metal oxide fine particles such as $SiO_2$, $TiO_2$, $ZrO_2$, $SnO_2$, and $Al_2O_3$.

As "functional additive," exemplified are, e.g., leveling agent, surface adjusting agent, and defoaming agent.

Figure 4A:
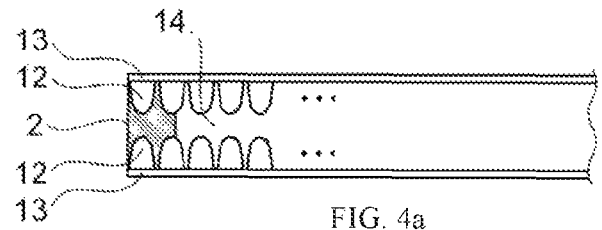
FIGS. 4 (a) to 4(c) are views showing states of a space in the transparent laminate according to the embodiment of the invention.
Figure 4B:
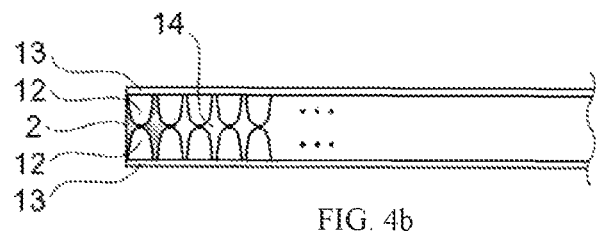
Figure 4C:
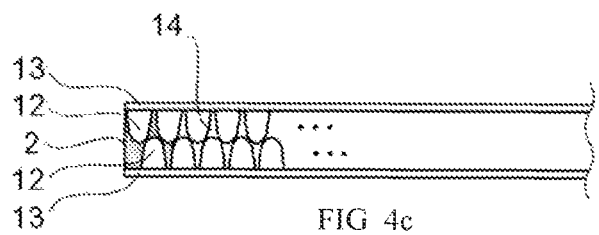

The transparent laminate according to this embodiment includes a plurality of filmy members 10 in which the moth-eye structures made of the structures 12 of protrusions and recesses with the pitch no more than the visible light wavelength are formed on double sides of the base 11, and at least the ends of the filmy members 10 are overlapped with the adhesive layer 2 such as an adhesive. The space 14 is formed between the structures 12 between the overlapped filmy members 10. As patterns of the space 14, various patterns are conceivable, but some examples are shown in FIGS. 4(a) to 4(c). The space 14 can be made of a resin such as an adhesive. That is, the space 14 can be an air layer as well as a resin layer.

That is, FIG. 4(a) shows a situation that the air layer is formed as the facing structures 12 are not in contact with each other according to the thickness of the adhesive layer 2. FIG. 4(b) shows a situation that the air layer is made at the recesses because the structures 12 are continuations of the protrusions and the recesses though the tips of the structures 12 facing each other are in point contact with each other. FIG. 4(c) shows a situation that, although the tip of the structure 12 encroaches the recess of the opposite structure 12, a prescribed air layer is formed, because the tip does not enter into the recess completely. In those situations, each air layer exists as the space. It is to be noted that the space is not limited to the air layer, and for example, where the entire surface of the structure 12 is adhered with the adhesive layer 2, the adhesive layer 2 may include the space or spaces in a broad sense as a matter of course.

In this embodiment, because the structures 12 are arranged in a regular manner and keep regularity even when viewed in a row direction as well as a column direction, overlapping can be done well.

Although overlapping is done with the adhesive layer 2 such as, e.g., adhesive, the adhesive layer 2 is formed at an outer peripheral portion as to be out of the viewing field when attached, in this embodiment. That is, it is arranged at an area other than the viewing field. For example, the structures 12 of the filmy member 10 may be jointed partly with the adhesive layer 2 at the four corners of the filmy members 10 or at areas extending in a shorter side direction in a prescribed width and a prescribed length at right and left ends of the filmy member 10.

As described above, the adhesive layer 2 is not formed on the entire surface of the filmy members 10, thereby improving the peelability of the filmy member 10 itself, improving the mold releasing property of the adhesive as the adhesive layer 2 or namely avoidance of the visible recognition reduction due to residues, and avoiding deformations from occurring due to thickness of the adhesive as the adhesive layer 2. It is to be noted that if the transmittance feature is made as the top priority, it is as a matter of course to adhere the entire surface with an adhesive or the like. In this case, resin composites may be selected properly as to make good the refraction index to improve the visual recognition property.

Figure 5:
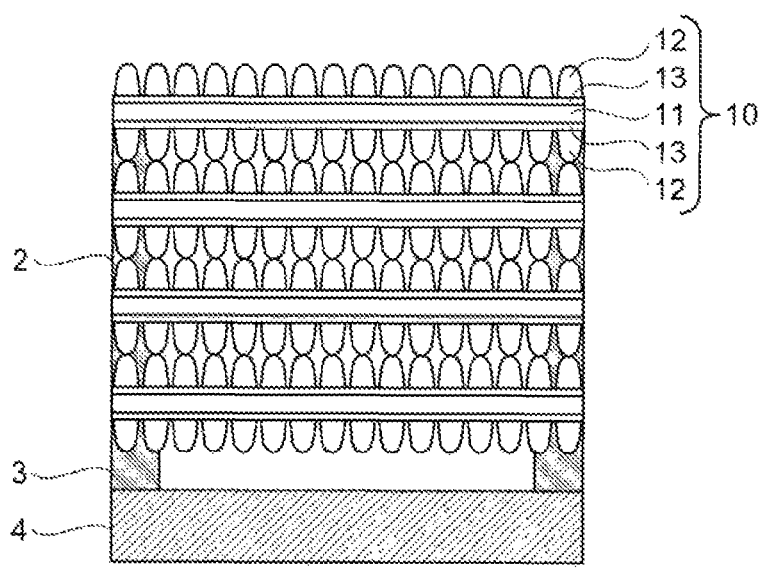
FIG. 5 is a structural view of a protection tool using the transparent laminate according to the embodiment of the invention.

The transparent laminate 1 according to this embodiment is an overlapped body having the moth-eye structure realizing the antireflection function provided on the double sides; the plural filmy members serving as the optical device are jointed with the plural adhesive layers; as shown in FIG. 5, the transparent laminate 1 is adhered via a sticking layer 3 to an adherend 4. As the adherend, exemplified are, e.g., visors of helmets, medical face shields, medical displays, and protection glasses for painting. The invention is not limited to those, and includes various optical tools used in an environment such that no one can predict arrivals of such contaminants and that immediate recovery of the vision field is required when contaminated, or in an environment such that contaminants are dangerous objects by themselves and contact to the objects is risky. The transparent laminate according to the embodiment can be adhered onto an antireflection film. The aherend 4 to which the transparent laminate 1 shown in FIG. 5 is adhered is corresponding to an example of the protection tool of the embodiment.

Although the sticking layer 3 can be made of an adhesive such as rubber and silicone, it is desirable to use acrylic adhesive to realize transparency. As such an adhesive, the adhesive can be formed of (meth)acrylic ester based copolymer having a weight-average molecular weight of 200,000 to 2,000,000, preferably of 500,000 to 2,000,000, and the copolymer may have a profile of weight-average molecular weight no more than 50,000 is equal to or less than 5%. In this situation, even where the sticking layer 3 is extended across the entire surface of the film, there will be no practical problem because of good peelability.

As described above, the transparent laminate according to the embodiment of the invention is formed of the plural filmy members 10 configured to be formed in an overlapping adhered manner with the plural structures 12 having the pitch is equal to or less than visible light wavelength on the double sides of the base 11 serving as a flexible transparent base, while a part of the area of the filmy members 10 is made as the space between the members.

Accordingly, the dirty or contaminated filmy member 10 can be peeled sheet by sheet even where no one has an extra time to wipe off the contaminants during. e.g., car racing or where contacting is risky because the contaminants are dangerous objects during, e.g., surgical operation, so that the viewing field can be recovered immediately, and so that nobody has to contact dangerous objects.

By arranging the moth-eye structure from the regular arrangement of the plural structures 12 on the double sides of the filmy member 10, where the plural filmy members 10 are overlapped and jointed with the adhesive layers 2 such as the adhesive agent, the transparency is prevented from lowering even where a space is formed between the moth-eye structures, and the antireflection function can be realized as reducing reflections at boundaries.

Such a moth-eye structure basically corresponds to all wavelengths as different from the antireflection film corresponding to a specific wavelength used for, e.g., liquid crystal displays, thereby bringing an advantage to make color tone unchanged when the object is viewed through the moth-eye structure. In addition, from the feature of the moth-eye structure, it is preferable to use the structure under an environment such that the luminance rapidly increases or that it takes a time for human eyes to get used to the luminance difference.

As described above, only the part of the structures 12 of the filmy members 10 are jointed with the adhesive layer 2 made of, e.g., adhesive as described above, thereby making advantageous in peeling promptly and easily, and preventing deformations due to the thickness of the adhesive from occurring. If the shield face is dirty, the filmy member 10 can be peeled off with light force when peeled because only the part of the area is adhered. By designing the most area in the viewing field to be the area not having the adhesive layer 2, glue residues of the adhesive layer 2 may not be generated in the viewing field where stocked or used in a high temperature, so that good viewing field is obtainable. Where the adhesive layer is provided in a broad area, the reason why the peeling force is made different between the end and the viewing recognition area is not to disturb the good peelability by the light force described above In a situation that the plural filmy members 10 are adhered across the entire surface, concentric Newton rings may be observed if a narrow slit comparable to the light wavelength between two transparent materials, but with the transparent laminate 1 according to the embodiment, the ring can be suppressed from occurring by forming the respective filmy members 10 with the moth-eye structure on the double sides.

According to the embodiment, the transparent laminate and the protection tool using the same can be provided, by overlapping the filmy members with the moth-eye structure, in preventing increased reflectance and reduced transparency, not losing promptness and easiness of peeling, improving mold releasing property of the adhesive, avoiding deformation due to the thickness of the adhesive from occurring, and ensuring the visual recognition property.

It is to be noted that, according to the embodiment described above, where the structure formed on the back side of the filmy member is hydrophilic whereas the structure formed on the front side is water-repellent, when the filmy members forming the transparent laminate are peeled off sheet by sheet, such the adhesive remains on the surface after peeling by forming the transparent laminate so that the adhesive layer such as the adhesive remains on the side of the peeled filmy member, thereby preventing a situation to promote attachments of arriving contaminants from occurring.

Where tabs or projections for taking-out are formed at right and left ends of the filmy members alternatively, respectively, the filmy members can be structured as to be peeled alternatively from the right side and then from the left side after the filmy member is removed from the left side. The tabs may have respective indications of the sheet number so as to make understandable the remaining sheet number of the filmy members 10.

As the adherend to which the transparent laminate according to the embodiment is applicable, exemplified are, e.g., visors of helmets, medical face shields, medical displays, and protection glasses for painting, but the adherend can include what is expectable for an effect on human eyes, and optical equipments such as cameras and telescopes. In a case of application to optical equipment, the transparent laminate may be required to have a corresponding feature such as filling a resin because the optical sense such as refractive index is directly different from the sense of human being.

Hereinafter, examples of the invention are described.

Example 1

Figure 6A:
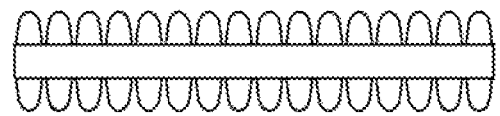
FIGS. 6(a) to 6(c) are structural views of a transparent laminate according to a first example of the invention.
Figure 6B:
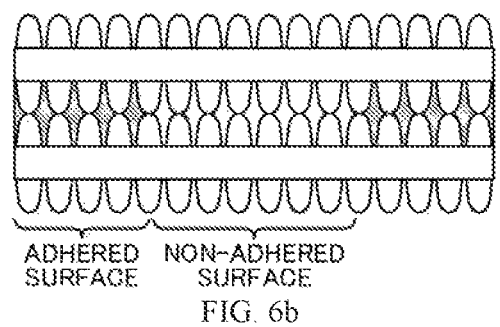
Figure 6C:
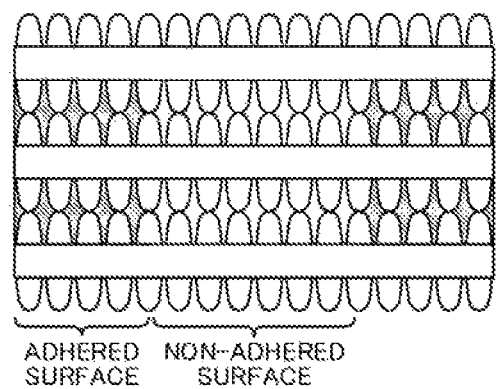

First, several drops of an ultraviolet curable resin were fallen to a master having a moth-eye structure in a shape of fine protrusions and recess not more than the light wavelength, and after a polycarbonate film serving as a transparent base corresponding to a substrate was covered on the resin, the resin was extended over the entire master with a roller. Subsequently, ultraviolet was radiated from the side of the polycarbonate film as the transparent base to cure the resin, and then, the master was removed to obtain the filmy member as an optical device. With substantially the same steps, the moth-eye shape was transferred from the master to the opposite surface side of the polycarbonate film, thereby obtaining the filmy member as the optical device having the shape of the protrusions and recesses on the double sides. The filmy members thus obtained were overlapped using, e.g., an adhesive as the adhesive layer, thereby obtaining three types of the transparent laminates including single layer, and two layers, three layers as well, which were overlapped respectively. That is, FIG. 6(a) shows the structure of the transparent laminate of the single layer; FIG. 6(b) shows that of the two overlapped layers; FIG. 6(c) shows that of the three overlapped layers, respectively. In this example, the adhesive layer is formed only at the end of the filmy member, so that the space is divided into an adhered surface and a non-adhered surface.

Example 2

Figure 7A:
FIGS. 7(a) to 7(c) are structural views of a transparent laminate according to a second example of the invention.
Figure 7B:
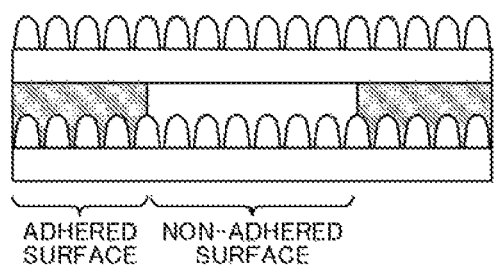
Figure 7C:
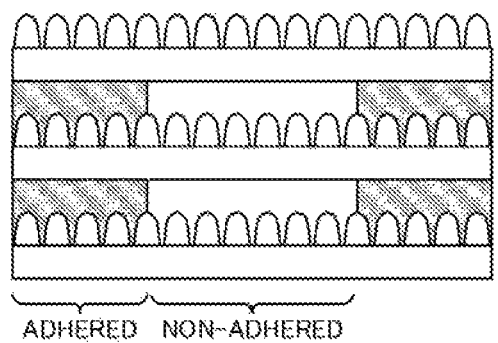

First, several drops of an ultraviolet curable resin were fallen to a master having a moth-eye structure in a shape of fine protrusions and recess not more than the light wavelength, and after a polycarbonate film serving as a transparent base corresponding to a substrate was covered on the resin, the resin was extended over the entire master with a roller. Subsequently, ultraviolet was radiated from the side of the polycarbonate film as the transparent base to cure the resin, and then, the master was removed to obtain the filmy member as an optical device. The filmy members thus obtained were overlapped using, e.g., an adhesive as the adhesive layer, thereby obtaining three types of the transparent laminates including single layer, and two layers, three layers as well, which were overlapped respectively. That is, FIG. 7(a) shows the structure of the transparent laminate of the single layer; FIG. 7(b) shows that of the two overlapped layers; FIG. 7(c) shows that of the three overlapped layers, respectively. In this example, the adhesive layer is formed only at the end of the filmy member, so that the space is divided into an adhered surface and a non-adhered surface.

Comparative Example 1

Figure 8A:
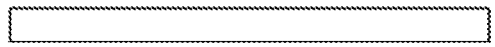
FIGS. 8(a) to 8(c) are structural views of a transparent laminate according to a first comparative example of the invention.
Figure 8B:
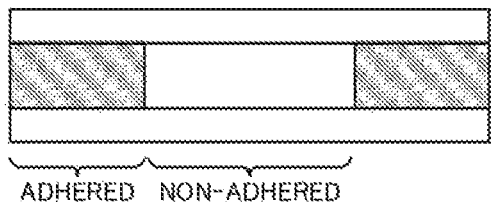
Figure 8C:
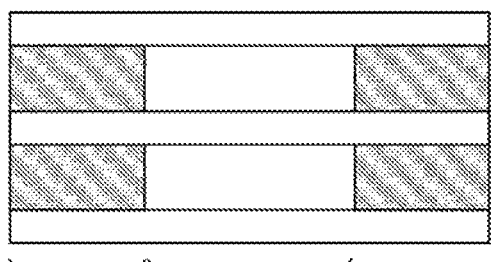

As Comparative Example 1, an optical PET (polyethylene terephthalate) film available in the market was used with, e.g., adhesive serving the adhesive layer to overlap two layer and three layers, thereby obtaining three types of the transparent laminates including the single layer. That is, FIG. 8(a) shows the structure of the transparent laminate of the single layer; FIG. 8(b) shows that of the two overlapped layers; FIG. 8(c) shows that of the three overlapped layers, respectively. In this example, the adhesive layer is formed only at the end of the optical PET film, so that the space is divided into an adhered surface and a non-adhered surface.

Optical Characteristic Evaluation

Reflection spectrum and transmittance spectrum of the transparent laminates of Examples 1, 2 and the transparent laminate of Comparative Example 1 were measured using an ultraviolet visible light spectrophotometer (made by JASCO Corporation, Product Name V-500).

Consequences

The evaluation consequences of the optical characteristic are shown in Tables 1, 2 below.

That is, the evaluation consequences of the transmittance of each of the overlapping structures of Examples 1, 2 and Comparative Example 1 are as shown in Table 1.

Figure 11:
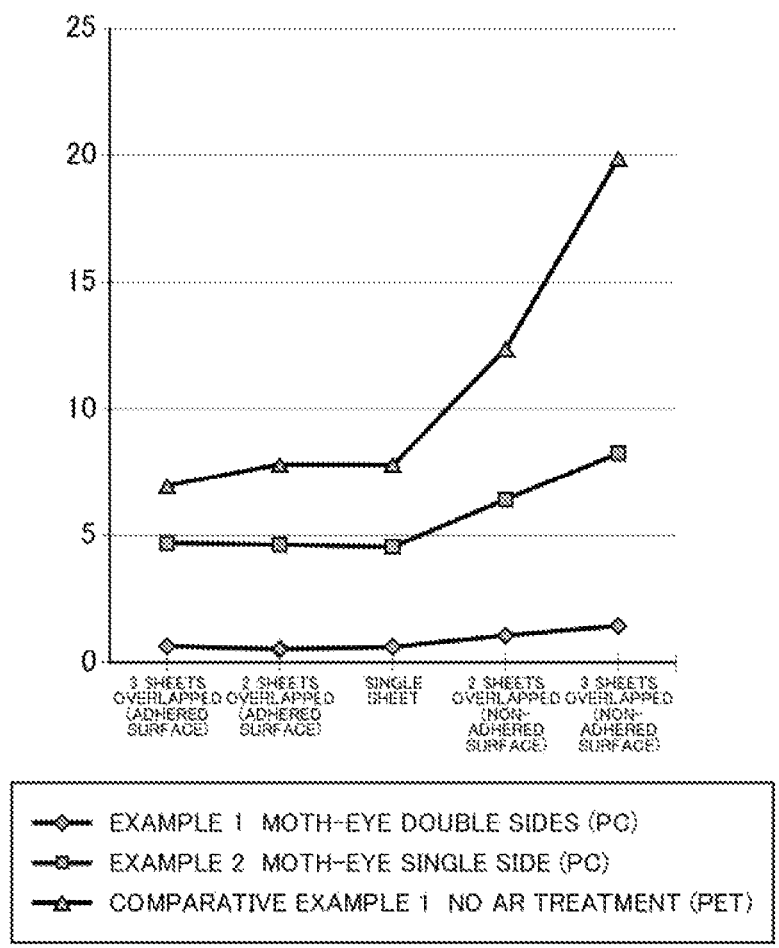
FIG. 11 is a graph showing evaluation consequences of reflectance of the transparent laminate according to the embodiment of the invention.

A state showing the consequences is shown in FIG. 11.

Review

According to the evaluation consequences described above, the transmittance of n-layer can be a transmittance of the single layer multiplied by the n-th power. First, with Example 1, from Table 1 and FIG. 9, the transmittance was very high even where three sheets are overlapped, and it turned out that the transmittance was ensured to be not less than the transmittance of the single layer of Example 2, and Comparative Example 1. That is, for example, the transmittance of the single layer in Example 2 was 95.29%, while in Example 1, at the adhered surface, two sheets overlapped have a transmittance of 99.13% whereas three sheets overlapped have a transmittance of 98.85%, and twenty sheets overlapped have that of 95.74%, and at the non-adhered surface, two sheets overlapped have a transmittance of

TABLE 1

| [transmittance] | Adhered Surface | | | |
|---|---|---|---|---|
| | 50 sheets overlapped (adhered surface) | 20 sheets overlapped (adhered surface) | 3 sheets overlapped (adhered surface) | 2 sheets overlapped (adhered surface) |
| Example 1 Moth-eye Double sides (PC) | 90.15 | 95.74 | 98.85 | 99.13 |
| Example 2 Moth-eye Single side (PC) | 82.62 | 92.83 | 94.96 | 95.14 |
| Comparative Example 1 Non AR treatment (PET) | 63.80 | 84.23 | 91.45 | 91.21 |

| [transmittance] | Non Adhered Surface | | | | |
|---|---|---|---|---|---|
| | Single sheet | 2 sheets overlapped (non-adhered surface) | 3 sheets overlapped (non-adhered surface) | 20 sheets overlapped (non-adhered surface) | 50 sheets overlapped (non-adhered surface) |
| Example 1 Moth-eye Double sides (PC) | 99.13 | 98.36 | 97.60 | 85.29 | 68.46 |
| Example 1 Moth-eye Single side (PC) | 95.29 | 90.91 | 86.90 | 48.03 | 23.75 |
| Comparative Example 1 Non AR treatment (PET) | 92.01 | 85.17 | 79.06 | 31.26 | 10.96 |

Figure 9:
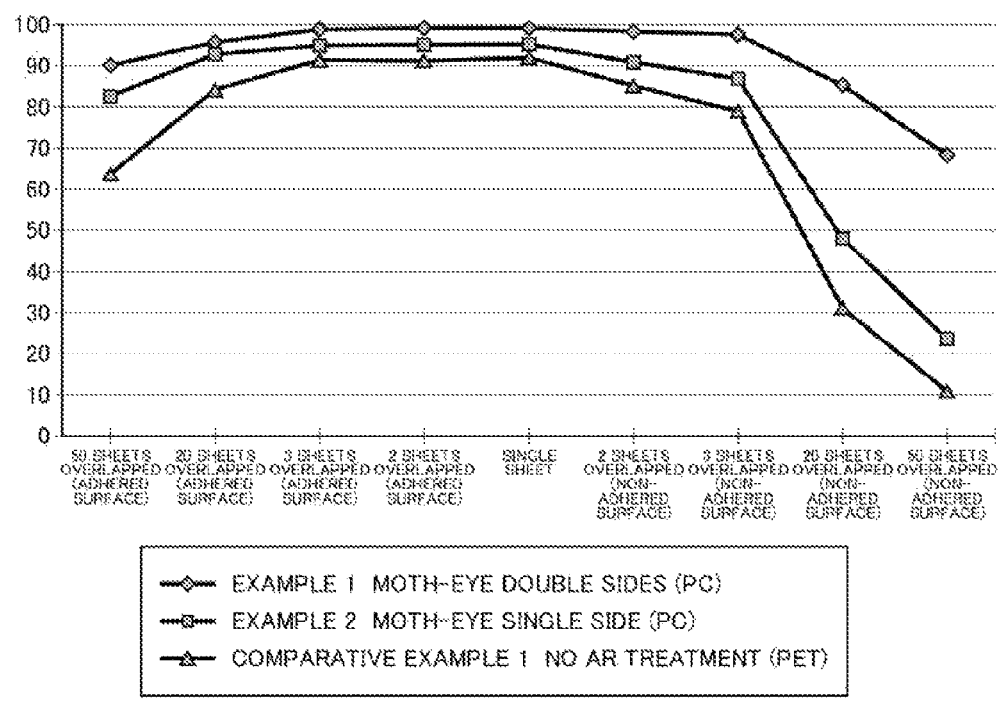
FIG. 9 is a graph showing evaluation consequences of transmittance of the transparent laminate according to the embodiment of the invention.
Figure 10:
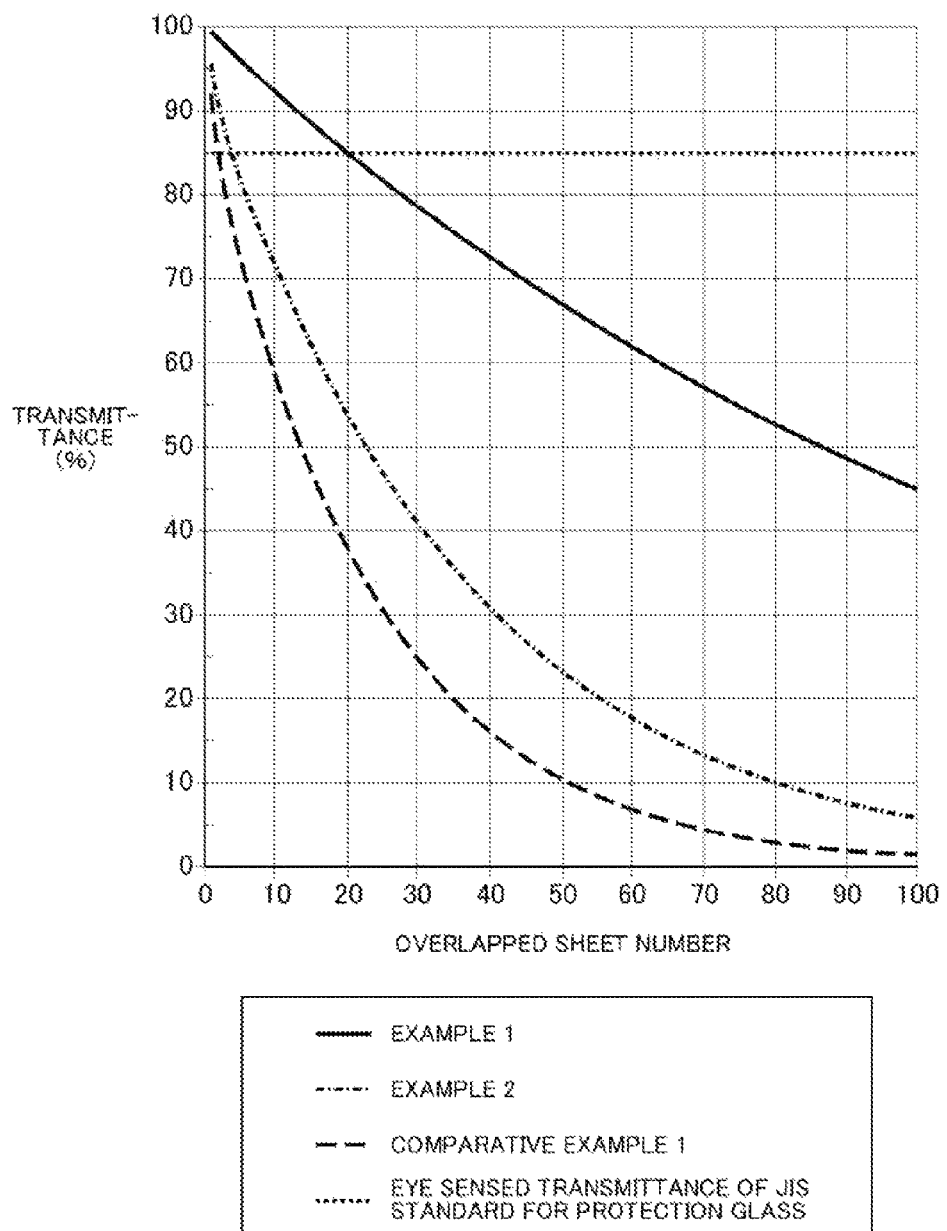
FIG. 10 is a graph showing evaluation consequences of transmittance of the transparent laminate according to the embodiment of the invention.

A state showing the consequences is shown in FIGS. 9, 10.

The evaluation consequences of the reflectance of each of the overlapping structures of Examples 1, 2 and Comparative Example 1 are as shown in Table 2.

98.36% whereas three sheets overlapped have a transmittance of 97.60%. Those exceed the value of the single layer of Example 2, and Comparative Example 1, and it was turned out that the transmittance was maintained at the good state.

TABLE 2

| [reflectance] | 3 sheets overlapped (adhered surface) | 2 sheets overlapped (adhered surface) | Single sheet | 2 sheets overlapped (non-adhered surface) | 3 sheets overlapped (non-adhered surface) |
|---|---|---|---|---|---|
| Example 1 Moth-eye Double sides (PC) | 0.64 | 0.52 | 0.61 | 1.06 | 1.44 |
| Example 1 Moth-eye Single side (PC) | 4.70 | 4.63 | 4.55 | 6.42 | 8.26 |
| Comparative Example 1 Non AR treatment (PET) | 6.97 | 7.82 | 7.80 | 12.38 | 19.88 |

In general, the required eye sensed transmittance of the JIS (Japanese Industry Standard) standard (JIS T8147 protection glass) is 85% or more, but as shown in FIG. 10, with Example 1, this required eye sensed transmittance was satisfied even in the case of 20 sheets overlapped. This means that the application range for standard products is wide. Regarding the reflectance, as shown in Table 2 and FIG. 11, the good result less than 4% was obtained even in the cases of two sheets overlapped and thee sheets overlapped, with the adhered surface as well as the non-adhered surface.

In Example 2, as shown in Table 1, and FIGS. 9, 10, at the adhered surface, the transmittance equal to or more than the transmittance of the single layer of Comparative Example 1 was ensured even in the cases of the two sheets overlapped, the three sheets overlapped, and the twenty sheets overlapped. In Example 2, however, the transmittance of the non-adhered surface was dropped about 4% as one sheet increases, and influence from reflection on a surface having no fine structure can be seen more or less. Regarding the reflectance, good results were obtained in comparison with the reflectance of the single layer of Comparative Example 1 even in the cases of the two sheets overlapped and the three sheets overlapped for the adhesive surface, and for the non-adhesive surface, it was turned out that the good results were obtained in comparison with the reflectance of the single layer of Comparative Example 1 in the case of the two sheets overlapped.

To the contrary, in Comparative Example 1, influences from the reflection at both boundaries of the film appeared, and the transmittance of the three sheets overlapped state was 79% on the non-adhered surface. This does not satisfy the required eye sensed transmittance 85% of the JIS standard (JIS T8147 protection glass), and it is apparent that there are adverse effects to the viewing field when the film is applied to the real shield.

It is to be noted that herein the applicability to the JIS standard products was stated as an example of usage, but the required transmittance and required reflectance are made different depending on the usage. In this case, for the transmittance, an approximate overlapping sheet number may be calculated by the transmittance of the single layer multiplied by the n-th power of the n-sheets overlapped.

Next, Examples 3 to 8 are described in detail.

Example 3

Hereinafter, the respective steps of a production of a nano structure sheet, a production of an adhesive resin, and a production of a transparent laminate, are described.

A. Production of the Nano Structure

First, an ultraviolet curable resin (having a post-cured refractive index of 1.53) was coated 4 microns with a bar coater on a surface of the polycarbonate (PC) support (having a refractive index of 1.58 and a thickness of 100 microns, and then, where a mold for the nano structure having a dot pitch of 230 nm and a dot interval between adjacent dots of 153 nm for protrusions and recesses of 220 nm, was engaged, the ultraviolet light was radiated from the PC base side to cure the resin, thereby obtaining a sheet having the nano structure on the surface.

B. Production of an Adhesive Resin

Subsequently, a toluene solution was added to an adhesive obtained from living radical polymerization as a main component to make a solid content 25%, and Coronate HX made of Nippon Polyurethane Industry Co., Ltd. of 20 part by weight was added as a crosslinking agent. The material was coated on a light-release processed PET film, dried, and sandwiched with a light-release processed polypropylene film (OPP), thereby obtaining the adhesive after stored for one week at a room temperature. The solid content was 25% upon adding the toluene solution. The main component is as follows.

Butyl acrylate: 80 part by weight,

Acrylic acid 2-ethylhexyl: 25 part by weight,

4-Hydroxybutylacrylate: 5 part by weight

C. Production of a Transparent Laminate

Figure 12A:
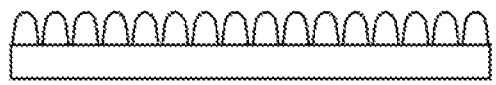
FIGS. 12(a) to 12(c) are structural views of transparent laminates according to third to eighth examples of the invention.
Figure 12B:
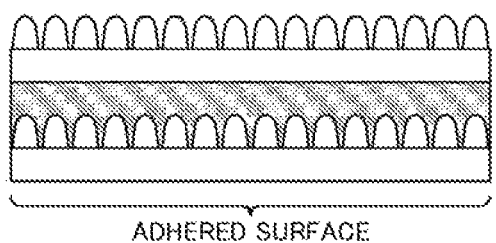
Figure 12C:
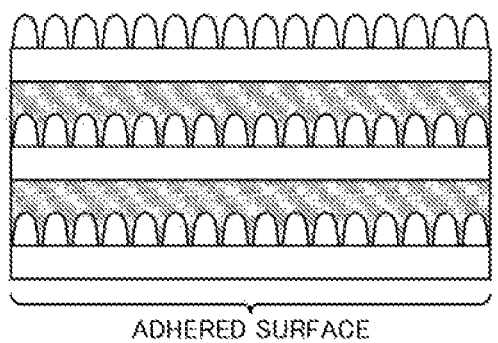

A corona processing is made on a surface to which the nano structure is not formed through the production A, and the light-release polypropylene film of the adhesive resin produced through the production B was peeled to stick the adhesive resin to the surface. A transparent laminate was obtained form adhering the material onto the surface of the nano structure obtained by another production A. FIG. 12(a) shows the structure of a transparent laminate of a single layer; FIG. 12(b) shows that of two sheets overlapped; and FIG. 12(c) shows that of three sheets overlapped. In this example, the adhesive used for overlapping the plural layers were formed across the entire surface of the filmy members.

Examples 4 to 8

Examples 4 to 8 were produced in substantially the same way as that for Example 3 except that Examples 4 to 8 have different resin composites as described above in detail.

Comparative Example 3

An adhesive was made in substantially the same way as those with the composite of Example 3 except that a resin not living polymerized but solution polymerized was used, thereby producing the transparent laminate in substantially the same way as Example 3.

The following evaluations were made for the transparent laminates of Examples 3 to 8.

Optical Characteristics

The total light transmittance (Tt) was measured (JIS-K-7361) with a haze meter made of Murakami Color Research Laboratory.

Adhesive Characteristics

The components of a weight-average molecular weight and the components of a profile of weight-average molecular weight no more than 50,000 were measured by a liquid chromatography.

Adhesive Peeling Strength

With respect to the peeling strengths of the nano structure support and between the nano structures, loads when peeled with a peeling angle of 90 degrees and a peeling speed of 300 mm/min, were sought by a tension testing machine.

Environment Test

In the environment test, changes of the peeling strength and the total light transmittance were measured after stored for ten days under the condition of 40 degrees Celsius and 90% RH (relative humidity).

The evaluation consequences described above are shown in Table 3 below.

TABLE 3

| | Initial characteristics (Transparent laminate) | | | Nano structure characteristics after stored 10 days 40 degrees Celsius 90% RH | | |
|---|---|---|---|---|---|---|
| | Total light transmittance % | Adhesive characteristics to nano structure N/25 mm | Appearance | Total light transmittance % | Adhesive characteristics to nano structure N/25 mm | Appearance |
| Example 3 | 95.0 | 0.4 | Normal | 94.5 | 0.7 | Normal |
| Example 4 | 95.2 | 0.3 | Normal | 94.7 | 0.6 | Normal |
| Example 5 | 95.1 | 0.1 | Normal | 94.6 | 0.4 | Normal |
| Example 6 | 95.2 | 0.2 | Normal | 94.7 | 0.5 | Normal |
| Example 7 | 95.0 | 0.2 | Normal | 94.5 | 0.4 | Normal |
| Example 8 | 95.1 | 0.5 | Normal | 94.6 | 0.8 | Normal |
| Comparative Example 3 | 95.0 | 0.5 | Normal | 94.5 | 1.8 | Irregularity |

The contents of the adhesives used for the transparent laminates of Examples 3 to 8, and the kinds of the crosslinking agents are shown in Table 4. It is to be noted that the adhesive includes the crosslinking agent or agents.

TABLE 4

| | Contents of Adhesive Structural Ratio | | | | |
|---|---|---|---|---|---|
| | BA Part by weight | 2-EHA Part by weight | 4-HBA Part by weight | EA Part by weight | CHA Part by weight |
| Example 3 | 80 | 25 | 5 | | |
| Example 4 | 80 | 25 | 5 | | |
| Example 5 | 80 | 25 | 5 | | |
| Example 6 | 80 | | 5 | 20 | |
| Example 7 | 80 | | 5 | | 20 |
| Example 8 | 80 | 25 | 5 | | |
| Comparative Example 3 | 80 | 25 | 5 | | |

| | Contents of Adhesive | | | |
|---|---|---|---|---|
| | Refining Processing | weight-average molecular weight Mw | profile of weight-average molecular weight no more than 50,000 Weight Ratio | Crosslinking Agent kind | Addition amount Part by weight |
| Example 3 | | 56 | 0.8 | Coronate HX | 20 |
| Example 4 | | 70 | 0.6 | Coronate HX | 20 |
| Example 5 | | 123 | 0.4 | Coronate HX | 20 |
| Example 6 | | 70 | 0.9 | Coronate HX | 20 |
| Example 7 | | 130 | 0.8 | Coronate HX | 20 |
| Example 8 | | 56 | 0.8 | Coronate HX | 20 |
| Comparative Example 3 | | 56 | 11 | Coronate HX | 20 |

BA: butyl acrylate;
2-EHA: acrylic acid 2-ethylhexyl;
4-HBA: 4-Hydroxybutylacrylate;
EA: ethyl acrylate;
CHA: cyclohexyl acrylate.

Figure 13A:
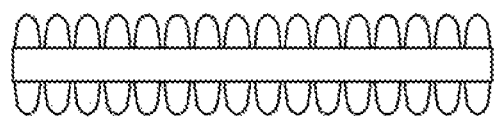
FIGS. 13(a) to 13(c) are views of another structure of a transparent laminate, serving as an overlapped structure with adhesive layers, having filmy member having a moth-eye shape on double sides, made through the same method as that for the first example of the invention
Figure 13B:
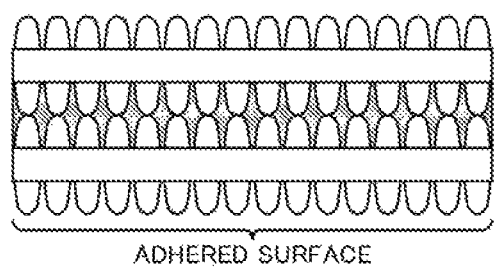
Figure 13C:
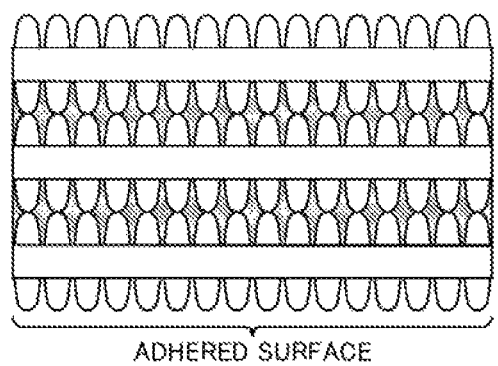

It is to be noted that FIG. 13(a) to FIG. 13(c) are views showing another structure of a transparent laminate, serving as an overlapped structure with adhesive layers, having filmy members having a moth-eye shape on double sides, made through the same method as that for the first example of the invention. That is, FIG. 13(a) shows the structure of the transparent laminate of the single layer; FIG. 13(b) shows that of the two overlapped layers; FIG. 13(c) shows that of the three overlapped layers, respectively. The adhesive used when overlapping the plural sheets are formed across the entire surface of the filmy members. Thus, the transparent laminates having the moth-eye structure on the double sides produced in substantially the same way as those in Example 1 bring advantages with no problem.

Review

According to the revaluation consequences of Examples 3 to 8 described above, it was turned out that, where the transparent laminate is formed by overlapping, with the adhesive, the transparent support, the base formed on at least one side with the plural structures whose pitch is equal to or less than visible light wavelength, and another base, it is desirable that the (meth)acrylic acid ester based copolymer having the weight-average molecular weight of 200,000 to 2,000,000 is used, and that the profile of weight-average molecular weight no more than 50,000 is 5% or less. With use of such the adhesive, the transparent laminate can suppress glue residues to the nano structure and changes of peeling force with the lapse of time.

With the transparent laminate or the optically transmitting laminate, the filmy members are laminated in a plural sheet number, while the space is formed between the filmy members at a part of the area of the filmy members, and the plural filmy members are laminated with the adhesive capable of peeling at the remaining area between the filmy members. The low molecular weight component of the weight-average molecular weight no more than 50,000 can be 2 part by weight or less. The filmy member can be laminated in a plural sheet number using an ultrasound melting method or a heating melting method.

Therefore, according to Examples 3 to 8, the transparent laminate can be realized with no glue remaining and no deterioration of adhesive characteristics.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

DESCRIPTION OF REFERENCE NUMBERS

1 transparent laminate
2 adhesive layer 3 sticking layer
4 adherend
10 filmy member
11 base
12 structure
13 bottom layer
14 space
20 filmy member
21 base
22 structure
30 filmy member
31 base
32 structure

What is claimed is:

1. A transparent laminate, comprising:
a plurality of filmy members each including:
a base; and
structures having protrusions and recesses, wherein the protrusions and recesses have a pitch no longer than visible light wavelength,
wherein the structures having protrusions and recesses are provided on at least one side of the base,
wherein the filmy members are overlapped and at least secured at an end thereof,
wherein the transparent laminate has a space between the overlapped filmy members, and
wherein the secured filmy members are jointed in a peelable manner with an adhesive layer arranged at least at an outer edge serving as the end.

2. The transparent laminate according to claim 1, wherein the structures are formed on double sides of the filmy member.

3. The transparent laminate according to claim 2, wherein the space is an air layer.

4. The transparent laminate according to claim 2, wherein the space is a resin layer.

5. The transparent laminate according to claim 1, wherein the space is an air layer.

6. The transparent laminate according to claim 1, wherein the space is a resin layer.

7. The transparent laminate according to claim 1, wherein the adhesive layer is formed at an outer peripheral portion extending outside a viewing field.

8. The transparent laminate according to claim 1, wherein the adhesive layer is formed at least across the entire surface of a viewing field.

9. The transparent laminate according to claim 8, wherein the adhesive layer is acrylic ester based copolymer having a weight-average molecular weight of 200,000 to 2,000,000 while a component of the copolymer having a profile of weight-average molecular weight no more than 50,000 is equal to or less than 5%.

10. The transparent laminate according to claim 1, wherein the filmy members are pasted to be overlapped using an ultrasound melting method or a heating melting method and are jointed in a peelable manner.

11. The transparent laminate according to claim 1, wherein at least one of the structures is hydrophilic.

12. The transparent laminate according to claim 1, wherein the filmy member has tabs for taking-out at right and left ends.

13. A protection tool formed with the transparent laminate according to claim 1 at a viewing area.

* * * * *